METHOD OF FORMING AND MOUNTING RELAY STRUCTURES

Filed April 24, 1967 4 Sheets-Sheet 1

INVENTOR.
ROBERT L. MARTIN
By Beehler & Arant
ATTORNEYS.

METHOD OF FORMING AND MOUNTING RELAY STRUCTURES

Filed April 24, 1967 4 Sheets-Sheet 2

INVENTOR.
ROBERT L. MARTIN
By Beehler & Arant
ATTORNEYS.

METHOD OF FORMING AND MOUNTING RELAY STRUCTURES

Filed April 24, 1967 4 Sheets-Sheet 3

INVENTOR.
ROBERT L. MARTIN
BY Beehler & Arant
ATTORNEYS.

July 22, 1969 R. L. MARTIN 3,456,336

METHOD OF FORMING AND MOUNTING RELAY STRUCTURES

Filed April 24, 1967 4 Sheets-Sheet 4

INVENTOR.
ROBERT L. MARTIN
By Beehler & Arant
ATTORNEYS.

United States Patent Office 3,456,336

Patented July 22, 1969

3,456,336

METHOD OF FORMING AND MOUNTING RELAY STRUCTURES

Robert L. Martin, La Canada, Calif., assignor to Charles E. Gutenlag, doing business as Publication Engineers, Los Angeles, Calif., a corporation Continuation-in-part of application Ser. No. 513,908, Dec. 13, 1965. This application Apr. 24, 1967, Ser. No. 633,289

Int. Cl. H01f *7/06;* H01r; H01h *11/00*

U.S. Cl. 29—602 9 Claims

ABSTRACT OF THE DISCLOSURE

The invention relates to electrical devices and in particular what are commonly designated micro-miniature contact devices most frequently embodied in electrical relays. The invention has special reference to a method of forming parts of such units and assembling the same so that there is no need for, and in fact so that there can be no adjustment of the contact elements once the device has been assembled. To perform the method of the disclosure several fixtures are employed. Typical fixtures are shown in FIGURES 1, 5, and 15. The fixture in FIGURE 1 has a projection fitting neatly within a coil form and an extension on the projection which has a width equal to the precisely desired distance between two fixed contacts. The coil form is placed upon the fixture, the fixed contacts laid in position on the assembly, and an adhesive then placed around the fixed contacts and permitted to harden while the extension of the projection remains in place. This permanently fixes the distance between the two fixed contacts. A movable contact on the end of a tiltably mounted armature is coined to a precise dimension across the end which moves between the two fixed contacts. Therefore, when the movable contact is mounted and located between the two fixed contacts, the clearance is positively and permanently established. On those occasions where a permanent magnet is employed in cooperative relationship with the armature bearing the movable contact, the air gap between the magnet and the armature is likewise established precisely and permanently by employment of a fixture like that shown in FIGURE 15. Here again, there is provided a projection on the fixture which establishes the distance between a pole face of a magnetic plate and the adjacent side of the armature. Adhesive of an appropriate kind is applied to the magnetic plate while the parts are held in position by the fixture and the adhesive allowed to form a permanent bond between the parts. When the device is then removed no further adjustment is possible of any of the contacts or the air gap, the precise adjustments being built into the device at the time it is assembled.

This application is a continuation-in-part of my application, Ser. No. 513,908, filed Dec. 13, 1965, now Patent No. 3,334,376.

Heretofore, the common practice in the manufacture of electric devices involving movable and fixed contacts has been to form and assemble the devices to the closest convenient tolerance, commensurate with economy and the ability of the workman, and thereafter to accurately adjust the position of the contacts to the degree of percision requisite for the particular circumstances involved. This technique has been commercially acceptable heretofore for electric moving and fixed contact devices of conventional sorts. In the recent past, however, there has been an increasing activity in the design and construction of miniature, sub-miniature, and micro-miniature devices such as relays. The trend is toward smaller and smaller components. Many of these components, when reduced to a desirable small size, are so small that they must be assembled and worked on under high powered glasses and microscopes. Needless to say, the adjustment of contacts after assembly in devices of such minute size has presented major problems. The very fact that the devices are so small involves the obvious problem of changing the position of parts by minute increments in order to get the desired adjustment. In spite of the care exercised by the most skilled workman there is the ever present prospect of the personal equation in that human skill must be relied upon for the proper precision and there is always a limit to the reliability of human skill. Moreover, under even the best of circumstances, adjusting devices of such minute size is extremely time consuming and correspondingly costly.

It is desirable from a cost and reliability standpoint, therefore, to be able to assemble devices such as relays in a manner such that after assembly all critical dimensions are established by use of assembly jigs and fixtures, and related precision forming, permitting parts of typical fabrication tolerances to be assembled without accumulation of tolerances during assembly, thereby to achieve consistent final dimensional control. Dimensions such as the spacing between fixed contacts and dimensions respecting relationship between a normal fixed contact and the air gap at the magnetic plate are controlled by the assembly fixture, control in certain specific instances being of the relationship between the normal fixed contact and the air gap surface of the magnetic plate, such relationship being controlled by the assembly fixture in relationship to the axis of the inside diameter of the adjacent coil bobbin. An additional element involves the precise sizing of a movable contact acting between fixed contacts. Hence, such dimensions in keeping with the method involves precise sizing with respect to the distance between fixed contacts where the movable contact is expected to operate, in assembled condition.

It is therefore among the objects of the invention to provide a new and improved method and process for the assembly of micro-miniature electric contact devices wherein immovable contacts are fixed in position at precisely the right locations in a manner which makes it unnecessary and impossible to adjust them subsequent to assembly.

Another object of the invention is to provide a new and improved method and process for the forming of movable contacts with relation to the fixed position of fixed contacts so that after assembly there is a positive and permanent relationship between the sundry parts which needs no further adjustment.

Still another object of the invention is to provide a new and improved method and process for the forming and assembly of devices in the nature of relay devices by use of jigs and fixtures, whereby movable contacts are precisely sized with relationship to the ultimate positioning of fixed contacts and the actuating magnetic element, and whereby during assembly the position and spacing of fixed contacts is likewise established by tooling, thereby to establish a fixed and permanent relationship between the operating parts so that, once assembled, there is no need for adjustment and further so that the forming and positioning is automatically established by the tooling thereby to minimize and even to eliminate entirely the personal equation.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
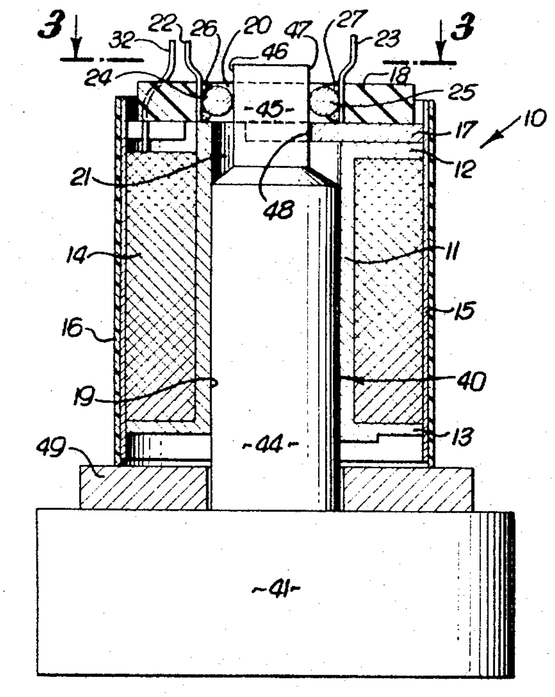
FIGURE 1 is a longitudinal sectional view of stationary portions of a typical relay structure mounted upon a fixture for the placement of the fixed contacts.

In the practice of the method herein disclosed, certain tooling is made use of both in the forming and assembly of the devices in which respective fixed and movable contact elements are employed in order to build into the device the requisite precision and also to so construct and assemble the device that the careful and precise setting initially built into the device cannot be disturbed by unnecessary attempts at adjustment.

A typical electrical component, indicated generally by the reference character 10 used to illustrate one form of the invention, consists of a spool-like coil form 11 having opposite ends 12 and 13 within which is wound a customary coil of wire 14. A tubular sleeve 15 surrounds the coil thus constructed with aid of the coil form and an exterior insulating cover 16 surrounds the sleeve 15.

At the upper end, as viewed in FIGURE 1, there is provided a magnetic plate 17 which is fixed in the position shown by appropriate conventional means. Over the magnetic plate 17 is an insulating disc 18, likewise fixed in position. A bore 19 within the coil form 11 communicates through a hole 20 in the insulating disc 18 through an opening 21 in the magnetic plate 17. One connection 22 for a fixed contact 24 is shown on the lefthand side of FIGURE 1 and a connection 23 for a fixed contact 25 is shown on the right. The fixed contacts 24 and 25, respectively, on the left and righthand side of the insulating disc 18 are shown held temporarily in position by masses 26 and 27, respectively, of an appropriate cement or adhesive. In the interest of good workmanship oversize recesses 28 and 29 may be provided in the insulating plate 18 at opposite ends of the fixed contact 24 for reception of the ends of the contact and for confinement of the mass 26 of adhesive. Similar oversize recesses 30 and 31 may be provided on the righthand side, as viewed in FIGURES 1 and 3, for opposite ends of the fixed contact 25 and the mass 27 of adhesive. Contacts 32 and 33 are shown connected to the coil 14.

Figure 2:
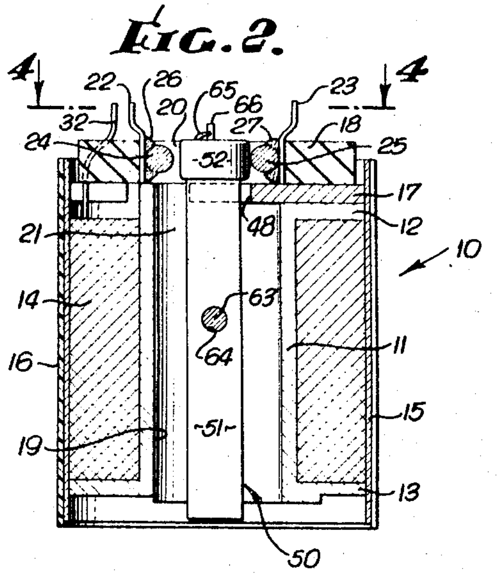
FIGURE 2 is a longitudinal view of the same relay structure showing the movable contact in position.
Figure 3:
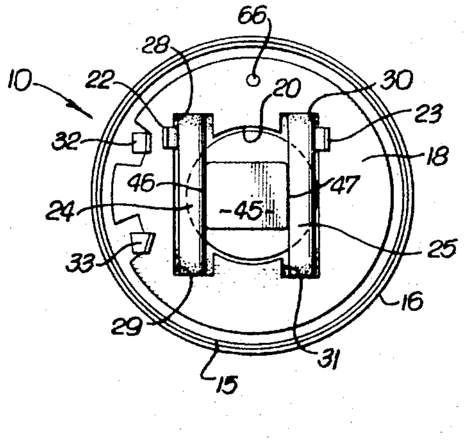
FIGURE 3 is a plan view on the line 3—3 of FIGURE 1.

In the form of the invention illustrated in FIGURES 1 through 7 inclusive, there is employed a fixture 40 mounted upon a base 41. When the core 19 is round, a shaft 44 of the fixture 40 is also made round so as to provide a snug sliding fit of the coil form on the fixture. An upper end 45 of the fixture, as viewed in FIGURES 1 and 3, is rectangular in cross-section. It is significant that opposite faces 46 and 47 of the end 45 are spaced a precise distance apart, namely the exact distance apart which is ultimately to be required for the spacing of the fixed contacts 24 and 25. In this form of the device, the face 47 is made long enough so that it will also serve to align itself with an opposing face 48 of the magnetic plate 17.

In making use of this portion of the method or process the electric component 10 is positioned on the fixture 40 by sliding the bore of the coil form over the shaft 44. A spacing washer 49 is used as a convenience so that the same fixture may be suitable for coil forms of different lengths.

As previously noted, the fixed contacts 24 and 25 may be held temporarily in position by some suitable adhesive. Variations of this, however, are contemplated within the method in that the fixed contacts may be kept separate from the component 10 until it has been placed upon the fixture and the fixed contacts 24 and 25 thereafter applied by dropping them into the recesses 28 and 29 in the case of the fixed contact 24, and the recesses 30 and 31 in the case of the fixed contact 25. If the second method is the method resorted to, drops of an appropriate adhesive can then be applied to opposite ends of the respective contacts in order to set and fix the positions of the fixed contacts on the insulated disc 18 with the distance between them fixed by the interpositioning of the end 45 of the shaft 44, as shown and described. This step in the method also establishes the position of the fixed contact 25 in particular with respect to the opposing face 48 of the magnetic plate 17, which in the embodiment illustrated is a position in precise longitudinal alignment. Appropriate adhesives include quick setting epoxies, quick drying adhesives of other kinds which may be either metallic or insulating, or sundry commercially available cements which are compatible with the materials respectively of the contacts, the connections, and the material of the insulated disc, and ultrasonic staking of the plastic material.

Figure 7:
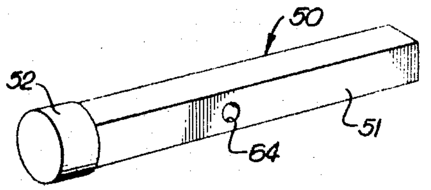
FIGURE 7 is a side perspective view of the movable contact member.
Figure 5:
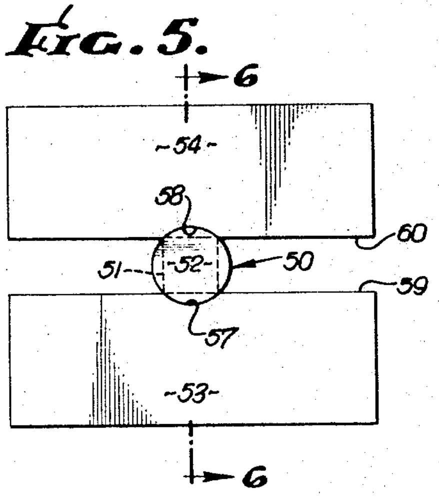
FIGURE 5 is an end elevational view showing the process step of forming the movable contact member.
Figure 6:
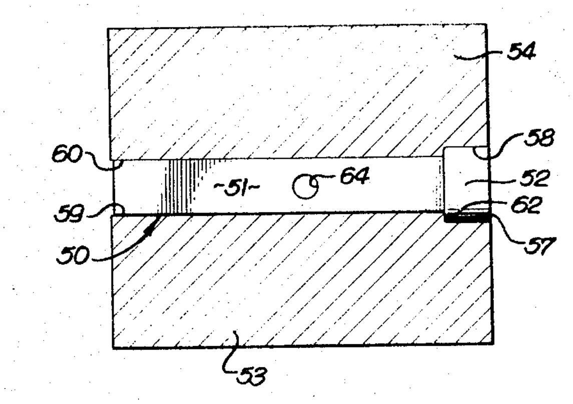
FIGURE 6 is a longitudinal sectional view on the line 6—6 of FIGURE 5.
Figure 8:
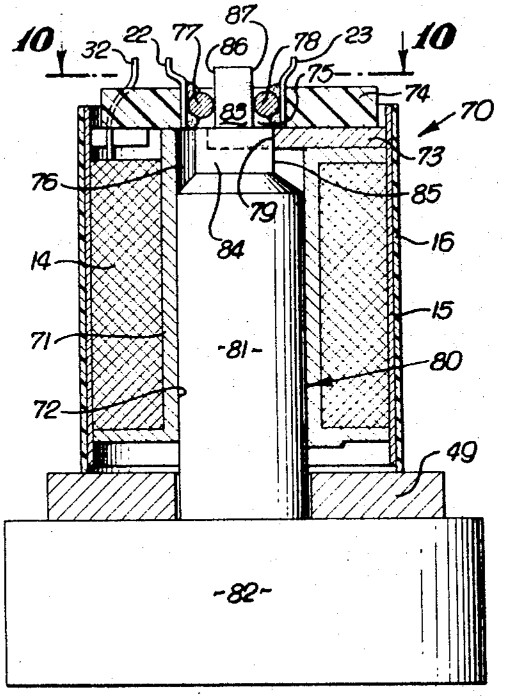
FIGURE 8 is a longitudinal sectional view of a slightly different form of typical relay structure mounted upon an appropriate fixture.

Another step in the process is to properly size a movable contact element such as the movable contact member 50 shown in perspective in FIGURE 7. The movable contact element includes an arm 51 and a contact element 52. This is accomplished by the employment of coining dies 53 and 54 with appropriate spaces 55 and 56. In the coining die 53 is a recess 57 and in the coining die 54 is a complementary recess 58. By precisely forming the recesses 57 and 58 with respect to surfaces 59 and 60 of the coining dies, the travel of the die will be limited by surfaces 59 and 60 contacting the respective surfaces of armature 51 precision forming the space between bottoms of the recesses 57 and 58. It is also significant and important that the distance between the surface 59 and the bottom of the recess 57, as exemplified by the step 62, be also precisely determined.

The movable contact element 50 is then placed in position on, for example, the lower coining die 53 with the contact element 52 lying within the recess 57 and the arm 51 resting upon the surface 59. The upper coining die 54 is then applied to the opposite side of the movable contact member and the dies are forced together by conventional means (not shown). Quite frequently, the contact element is of gold or other appropriate soft maleable material which readily flows and forms in response to coining of the type described. The arm 51 may be of other appropriate magnetic material considerably less ductile than the contact material.

Figure 4:
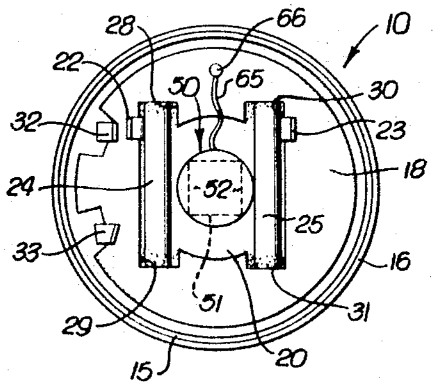
FIGURE 4 is a plan view on the line 4—4 of FIGURE 2.

After the movable contact 52 has been coined with the precision made possible by the coining operation, it is placed within the component in the position shown in FIGURES 2 and 4, and there pinned in a pivoted mounting by employment of a pin 63 extending through a hole 64 in the arm 51 and into appropriate holes (not shown) in the coil form 11 or mounted in a suitable fixture or carriage. To complete the electrical phase of the assembly, a flexible ribbon contact 65 is attached to the contact element 52 and connected to an appropriate post 66 on the insulating disc 18. Other operative elements of the electric component customarily present have been omitted in the interest of clarity in disclosing the method steps of forming and assembling those parts, the relationship of which is to be permanently set in a precise fashion and moreover in a fashion which prevents any subsequent resetting or adjustment.

A second form of the method illustrated in FIGURES 8 through 14 inclusive is made reference to in order to disclose the versatility of the method where a different spaced relationship may be encountered. In the form illustrated by FIGURES 8 through 14 inclusive, an electric component 70 employs a coil form 71 having a bore 72 therethrough, at the upper end of which is a magnetic plate 73 and an insulating disc 74. A hole 75 in the insulating disc 74 communicates with the bore 72 through an opening 76 in the magnetic plate 73. Fixed contacts 77 and 78 are made use of, but it should be noted that the fixed contact 78 is offset with respect to an opposing face 79 of the magnetic plate 73. Other portions of the electric component 70 are substantially the same as corresponding portions of the electric component 10 and have been similarly designated.

In setting the fixed contacts 77 and 78 a fixture 80 of slightly different form is made use of. The fixture 80 consists of a shaft 81 supported upon a base 82, the shaft 81 having an outside diameter of such size as to provide a snug sliding fit in the bore 72. In this form there is an upper end 83 for the shaft 81 of relatively small rectangular shape and an intermediate end 84 of a somewhat larger rectangular shape. In making use of this form of the invention, the coil form 71 is applied as previously described over the shaft 81 and the magnetic plate 73 so fixed in position that the opposing face 79 precisely engages an adjacent face 85 of the intermediate end 84. The fixed contacts 77 and 78 are then positioned upon the insulating disc 74 and there cemented into place so that they are precisely in engagement with opposite faces 86 and 87 of the upper end 83. By this operation the contacts 77 and 78 are precisely spaced from each other and the contact 78 by the same operation is precisely spaced in offset relationship with respect to the opposing face 79 of the magnetic plate 73.

Figure 9:
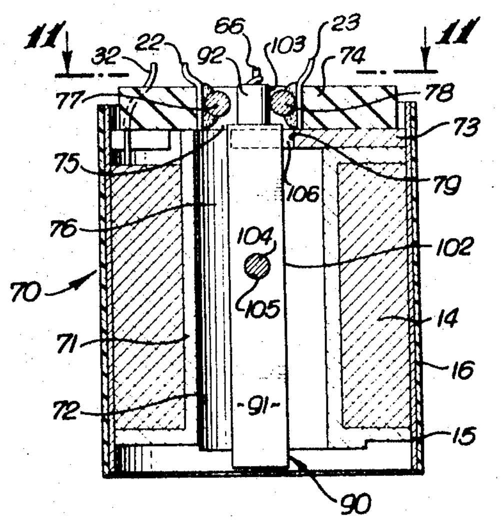
FIGURE 9 is a longitudinal view of the same relay structure as in FIGURE 8 showing the movable contact member in position.
Figure 10:
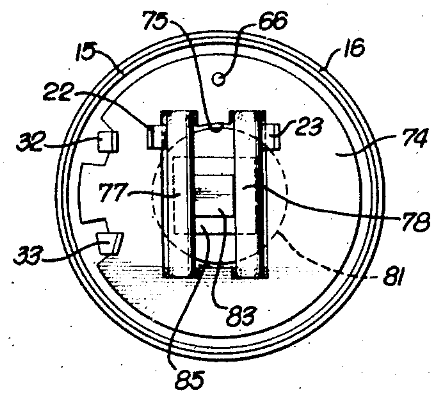
FIGURE 10 is a plan view on the line 10—10 of FIGURE 8.
Figure 11:
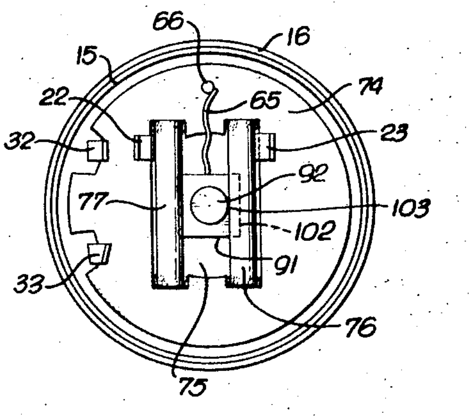
FIGURE 11 is a plan view on the line 11—11 of FIGURE 9.
Figure 12:
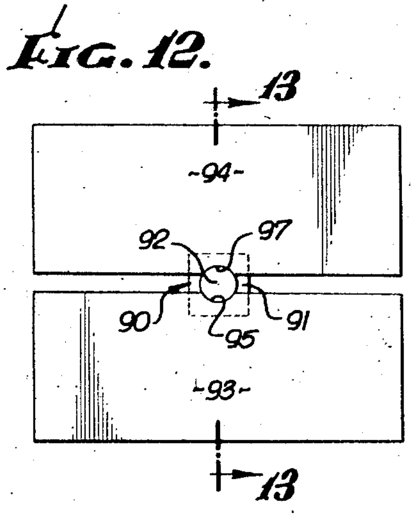
FIGURE 12 is an end elevational view showing a method step in the forming of a movable contact member.
Figure 13:
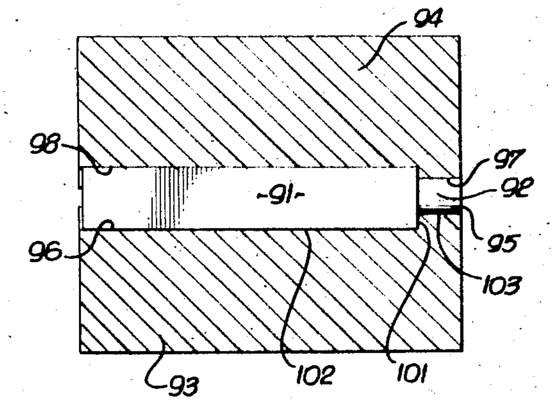
FIGURE 13 is a longitudinal sectional view on the line 13—13 of FIGURE 12.
Figure 14:
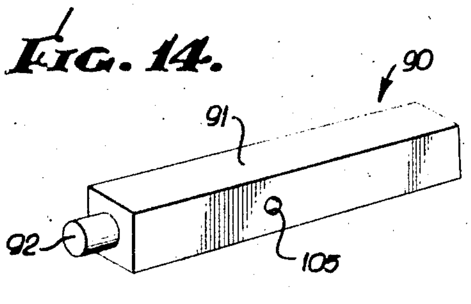
FIGURE 14 is a side elevational view of the movable contact member of FIGURES 12 and 13.
Figure 15:
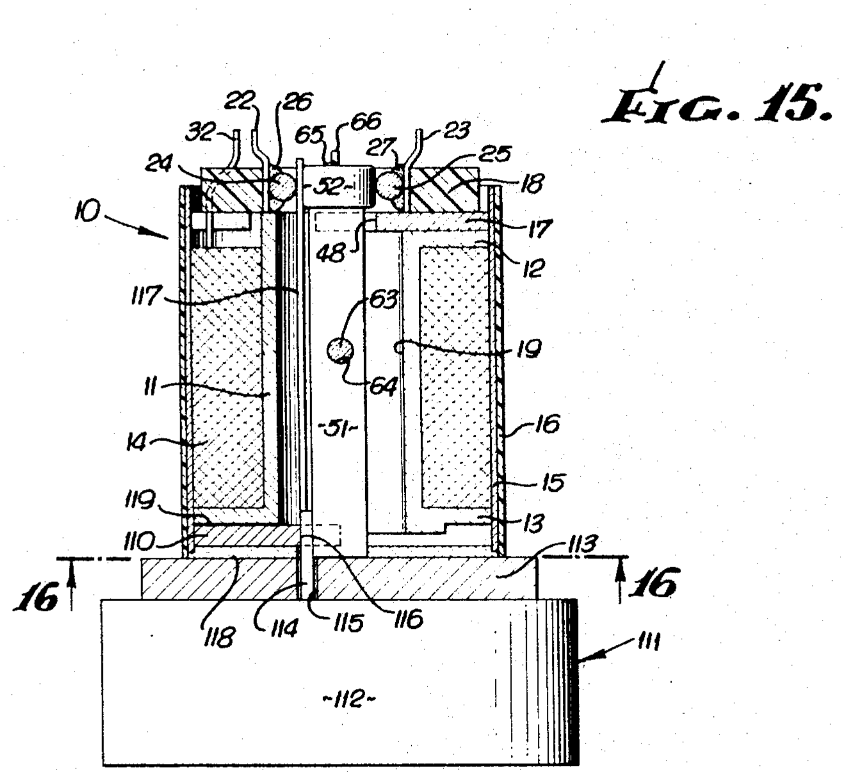
FIGURE 15 is a longitudinal sectional view of the relay structure of FIGURES 1, 2, 3, and 4 and a suitable fixture showing the step of positioning a magnetic plate.
Figure 16:
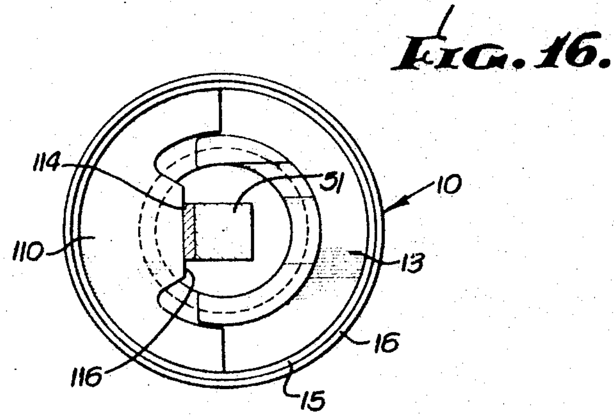
FIGURE 16 is a cross-sectional view on the line 16—16 of FIGURE 15.

A movable contact member 90, shown in FIGURES 9, 11, and 14, consists of an arm 91 and contact element 92. This movable contact member is likewise coined in the same general fashion as previously described, except that coining dies 93 and 94 are somewhat differently formed. In the coining die 93 a recess 95 is provided for the contact element 92 and a recess 96 for the arm 91. Similarly, in the coining die 94 there is a recess 97 for the contact element 92 and a recess 98 for the arm 91 on the opposite side. The dies are then pressed together until travel is limited by surfaces 96 and 98 contacting appropriate surfaces of member 90 as previously described in some appropriate conventional fashion. In this way, the contact element 92 is formed with precision as is also a step 101 which establishes the spacing between an appropriate side 102 of the arm 91 and the corresponding side 103 of the contact element 92.

The movable contact member, thus precision formed, is mounted by use of an appropriate pivot pin 104, extending through a suitable hole 105 in the arm 91 and appropriate holes in a supporting member (not shown) or if preferred in a portion 99 of the coil form. Mounted as described, the contact element 92 when positioned between the fixed contacts 77 and 78 is precisely spaced from the contact 77 when in engagement with the fixed contact 78 so that a precise amount of movement is thus established. By the same procedure a gap 106 is formed with precision between the opposing face 79 of the magnetic plate 73 and the adjacent side 102 of the movable contact member 90.

Inasmuch as it is also necessary to provide a proper gap between a magnetic plate 110 and the end of the arm 51 which is remote from the contact element 52, a fixture 111 is made use of. The fixture consists of a base 112 and spacing washer 113 upon which the component 10 is adapted to be mounted. A shim 114 extending upwardly from the base 112 to an opening 115 in the spacing washer has the desired fit to provide for an air gap between a pole face 116 of the magnetic plate 110 and the adjacent face of the arm 51. In order to have this gap undisturbed by inadvertent tilting of the arm 51 there is an extension 117 on the shim 114 which extends upwardly between the contact element 52 and the fixed contact 24. A second thinner spacing washer 118 is located inside of the cover 16 and the sleeve 15 upon which the magnetic plate 110 rests independently.

In making use of the fixture 111 the magnetic plate 110 is placed in the position shown spaced from the arm 51 by the shim 114, while at the same time the contact element 52 is held in position against the fixed contact 25 by the extension 117. A layer 119 of adhesive is then permitted to set up while the parts remain fixed in the position determined by the fixture, after which the component is removed and the spacing of the magnetic plate 110 has thus been established.

Although the method described herein has been particularly related to a simple electric relay having a cylindrical bore through the coil form and provided with a single magnetic plate and a single pair of fixed contacts, it will be understood that the same method of fixing the positions of fixed contacts and precision forming of movable contacts can be made use of in a variety of circumstances by employment of a fixture making use of the principles of the method referenced to an established point, face or surface of the electric component, and the setting of the fixed contacts thereby fixed. Further still, although the movable contact may take many forms, such for example as one being rectangular or otherwise in cross-sectional shape, nevertheless, by initially establishing the shape and size of the movable contact and its relationship to the supporting arm with precision by the use of appropriate dies and tooling, the clearances are thus built into the parts prior to assembly and once assembled, adjustment of the positioning of the contacts becomes not only unnecessary but is in fact prohibited by the character of the device built and assembled in accordance with the method and procedure as described herein.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A method of forming and mounting miniature electric contact unit parts which include a fixed contact and a movable contact attached to a coil member having a stationary reference portion thereon and an electro-magnetic plate attached to the coil member, said method comprising making a fixture with one portion having a snug fit against said reference portion and another portion having a precise location with respect to said fixed contact, coining a face on said movable contact member at a precise location thereon relative to a mounting portion of the movable contact member, placing said unit on the fixture with said reference portion in engagement with said one portion of the fixture and with said fixed contact in engagement with said other portion of the fixture, anchoring said fixed contact in final position while the unit is on the fixture and the fixed contact and the reference surface are engaged respectively with said other portion and said one portion of the fixture, removing said unit from said fixture and movably mounting said movable contact on the coil member.

2. A method of forming and mounting miniature electric contact unit parts which include a coil form having a bore therethrough, a pair of fixed contacts, a movable contact member and an electro-magnetic plate attached to the coil form, said method comprising making a fixture with one portion having a snug fit on said bore and another portion having a width equal to precisely the desired final distance between said pair of fixed contacts, fixing respective parts of said other portion of said fixture at precise locations required respectively for engagement with a face of the magnetic plate and with said fixed contacts, establishing faces on said movable contact member with the distance between opposite faces at an established dimension less than the distance between said fixed contacts, placing said unit on the fixture with said face of the magnetic plate in engagement with one part of said other portion of said fixture and with said fixed contacts in engagement with opposite sides of the other part of said other portion of the fixture, anchoring said fixed contacts in final position relative to said magnetic plate and to each other while the unit is on the fixture and the fixed contacts and the magnetic plate face are engaged respectively with said parts of said other portion of the fixture, and removing said unit from said fixture.

3. A method according to claim 2 including movably mounting said movable contact member on said coil form.

4. A method according to claim 2 including coining the faces of the movable contact so that a portion of the movable contact is spaced laterally from an adjacent face whereby said movable contact will clear said magnetic plate when in operation.

5. A method according to claim 2 including making the surface of the fixture which engages the magnetic plate coincident with the surface of the fixture which engages said one of said fixed contacts.

6. A method according to claim 2 including coining said movable contact into a non-circular shape in cross-section.

7. A method according to claim 1 including providing spaces for said fixed contacts at approximate locations for initially positioning of the fixed contacts in engagement with the fixture and then anchoring the fixed contacts in permanent positions.

8. A method according to claim 1 including placing a magnetic plate adjacent said coil member at an end opposite said fixed contact, placing said unit with said magnetic plate on a fixture, setting a gap between said magnetic plate and the end portion of the movable contact remote from said fixed contacts by use of a shim therebetween whereby to determine the width of said gap when said movable contact is in engagement with said fixed contact, and fixing said magnetic plate permanently in position while holding said shim in place.

9. A method according to claim 8 including holding said movable contact against said fixed contact by an extension on said fixture while the magnetic plate is being anchored in position on said unit.

References Cited

UNITED STATES PATENTS

| | | | |
|---|---|---|---|
| 3,310,863 | 3/1967 | Ellwood et al. | 29—622 |
| 3,335,376 | 8/1967 | Martin | 335—203 X |
| 3,388,463 | 6/1968 | Insley | 29—622 |

JOHN F. CAMPBELL, Primary Examiner

C. E. HALL, Assistant Examiner

U.S. Cl. X.R.

29—203. 622